(12) United States Patent
Benjey

(10) Patent No.: US 6,637,778 B2
(45) Date of Patent: Oct. 28, 2003

(54) LOW PERMEATION CAM LOCK FOR PLASTIC FUEL TANK VAPOR VENT VALVE

(75) Inventor: Robert P. Benjey, Dexter, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/990,057

(22) Filed: Nov. 21, 2001

(65) Prior Publication Data

US 2003/0094763 A1 May 22, 2003

(51) Int. Cl.[7] .............................................. F16L 41/00
(52) U.S. Cl. ....................... 285/209; 285/305; 403/320
(58) Field of Search ........................ 285/305, 208–209, 285/194, 205, 220, 139.1; 403/315–318, 320; 411/528, 521, 517

(56) References Cited

U.S. PATENT DOCUMENTS

| | | | |
|---|---|---|---|
| 477,308 A | * 6/1892 | McFarland | 222/91 |
| 766,083 A | * 7/1904 | Watts | 222/90 |
| 1,062,635 A | * 5/1913 | Clements | 411/521 |
| 1,159,685 A | * 11/1915 | Killefer et al. | 222/91 |
| 1,319,124 A | * 10/1919 | Stewart | 285/209 |
| 1,398,083 A | * 11/1921 | Tibbetts | 285/209 |
| 1,401,584 A | * 12/1921 | Cizek | 222/569 |
| 2,241,793 A | * 5/1941 | Steven | 220/293 |
| 2,411,761 A | * 11/1946 | Stolberg | 411/517 |
| 3,347,293 A | * 10/1967 | Clark | 81/438 |
| 3,477,745 A | * 11/1969 | Williams et al. | 285/40 |
| 3,650,551 A | * 3/1972 | Akers | 285/143.1 |
| 3,915,477 A | * 10/1975 | Timmons | 285/40 |
| 4,343,581 A | * 8/1982 | Millheiser | 411/517 |
| 4,906,150 A | * 3/1990 | Bennett | 411/119 |
| 5,083,583 A | 1/1992 | Benjey | 137/587 |
| 5,901,733 A | * 5/1999 | Ohno et al. | 137/202 |
| 6,212,746 B1 | * 4/2001 | Cooks, Jr. | 29/243.56 |
| 6,454,549 B2 | * 9/2002 | Shafer | 417/423.1 |
| 6,520,545 B2 | * 2/2003 | Johll et al. | 285/124.1 |

* cited by examiner

Primary Examiner—Anthony Knight
Assistant Examiner—Lisa Bannapradist
(74) Attorney, Agent, or Firm—Roger A. Johnston

(57) ABSTRACT

A vapor vent valve has an annular locking ring received thereover, with surfaces thereon engaging the valve for limited axial movement therebetween and preventing relative rotation therebetween. A fuel tank has an access opening with a slit formed therein. The valve is inserted in the access opening and the end of the locking ring engaged in the slit, rotation of the valve causes the locking ring to feed completely through the slit to the interior of the tank and engages the inner surface thereof while continuing to engage the valve to retain and seal the valve in the access opening. The valve, locking ring and a seal ring may be pre-assembled to form a subassembly capable of being installed and locked on the fuel tank as a unit without the need for tools or fasteners.

14 Claims, 3 Drawing Sheets

LOW PERMEATION CAM LOCK FOR PLASTIC FUEL TANK VAPOR VENT VALVE

BACKGROUND OF THE INVENTION

The present invention relates to mounting of fuel vapor vent valves in plastic fuel tanks and particularly plastic fuel tanks for motor vehicles.

Presently in passenger cars and light trucks, the fuel tank has a vapor vent valve disposed in the fuel tank and positioned to have the valve inlet located in the vapor dome above the liquid fuel level and the valve outlet connected to a storage device such as a charcoal filled canister for storing fuel vapor when the engine is not running. Such valves are typically installed in the fuel tank through an access opening in the upper wall of the tank which requires adequate sealing of the valve about the opening.

Heretofore, it has been found satisfactory to provide portions of the valve exterior to the fuel tank formed of material compatible with the material of the fuel tank to enable sealing of the valve over the access opening by weldment. However, this technique has the disadvantages of relatively high cost in mass production and rendering the valve non-removable from the tank.

Furthermore, plastic fuel tanks are formed of material which is suitable for exposure to liquid fuel and vapor but which has a prohibitively high permeability to the vapor. Accordingly the tanks are formed with a non-permeable barrier layer embedded in the wall of the tank to minimize the escape of fuel vapor. However, where an access opening is formed in the upper wall of the tank for installation of the vapor vent valve, the barrier layer is broken and an area subject to vapor permeation is created.

It has thus been desired to provide a way or means of mechanically installing, sealing and retaining a fuel vapor vent valve through an access opening in the upper wall of a fuel tank in a manner which provides a simple one-piece assembly, is relatively low in cost and provides positive sealing of the vapor barrier layer in the tank wall.

BRIEF SUMMARY OF THE INVENTION

The present invention provides a technique for positively retaining and sealing a fuel vapor vent valve through an access opening in the upper wall of a plastic fuel tank having an embedded vapor barrier in a manner which seals the vapor barrier layer and also eliminates the need for separate fasteners at installation. The vapor vent valve may be supplied as a subassembly complete with a seal ring and a discontinuous locking ring provided thereon. Portions of the locking ring engage torque transmitting surfaces on the valve to prevent relative rotation therebetween; however, limited axial movement of the ring with respect to valve is permitted to facilitate installation on the tank. At installation the subassembly is inserted through the access opening with the locking ring registered against the exterior side of the access opening. The subassembly is then rotated and the edge of the locking ring engages and feeds through a slit formed in the edge of the access opening; and, upon continued rotation, the locking ring feeds axially completely through the slit until fully positioned within and engaged with the interior surface of the tank wall with portions of the locking ring engaging the exterior of the valve to prevent rotation of the valve once installed.

The valve, seal ring and locking ring may thus form a self-contained subassembly ready for installation and locking in the fuel tank without the need for separate fasteners or tools upon installation on the tank.

DETAILED DESCRIPTION OF THE INVENTION

Figure 1:
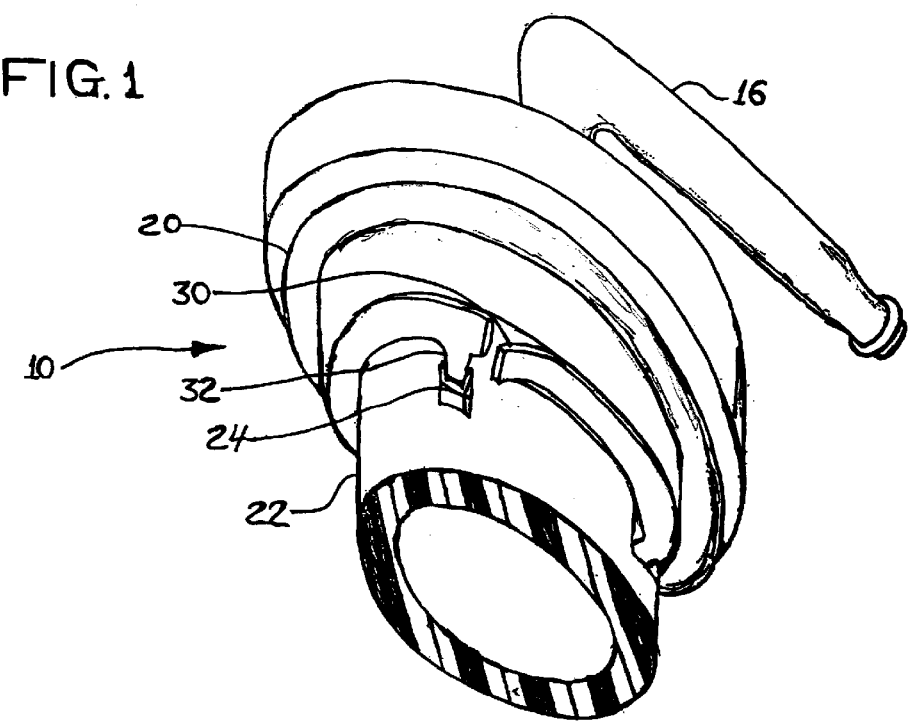
FIG. 1 is a perspective view of the valve subassembly of the present invention viewed from below the exterior mounting flange of the valve.
Figure 2:
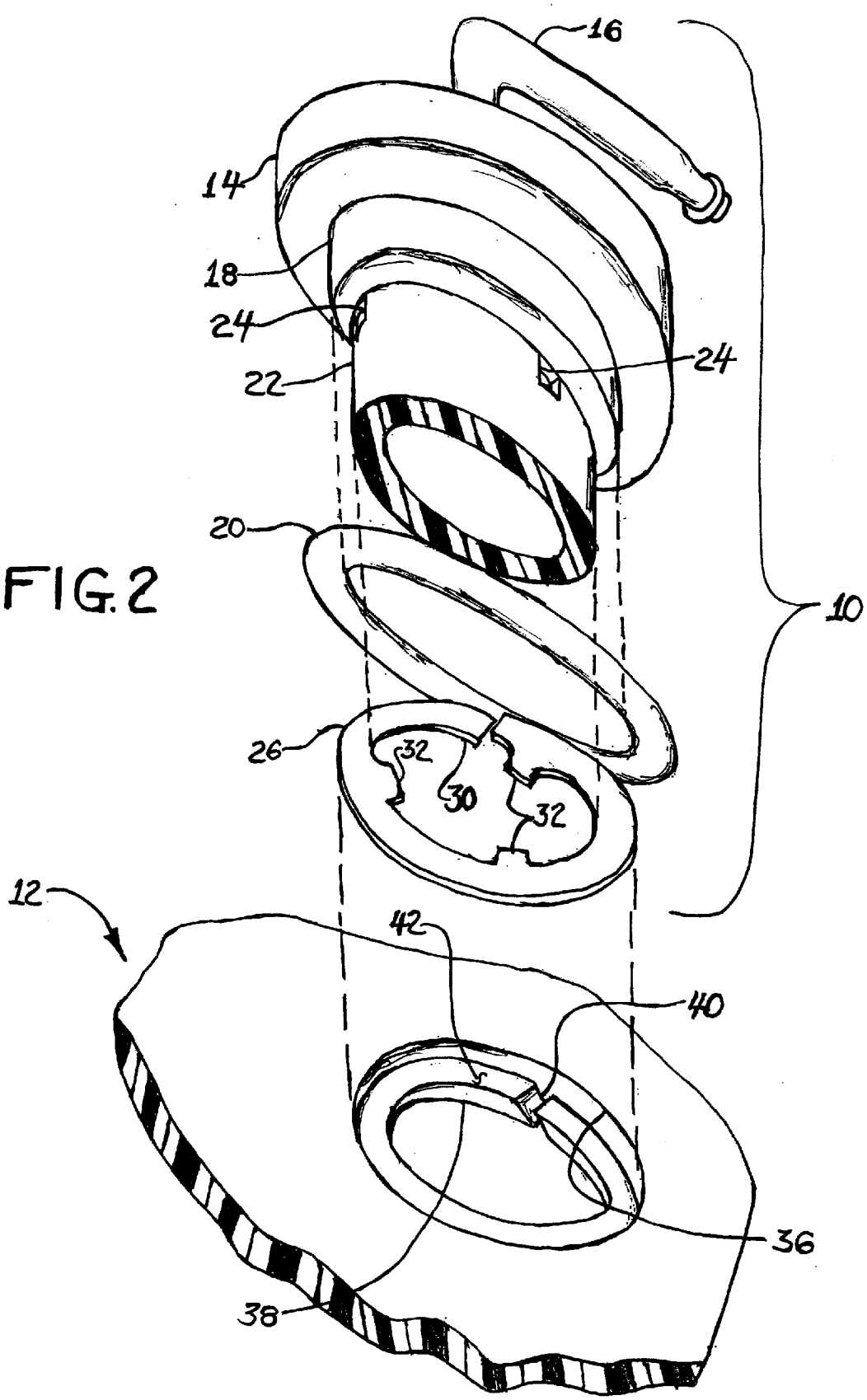
FIG. 2 is an exploded view of the subassembly of the present invention and the access opening in the upper wall of a fuel tank.

Referring to FIGS. 1 and 2, a preferred form of the invention having a subassembly including the valve is indicated generally at 10; and, the fuel tank wall indicated generally at 12. The valve has a body with an annular external mounting flange 14 having a hose fitting 16 preferably extending from the axial face thereof with a reduced diameter of annular portion 18 formed on the undersurface of the flange 14 with an annular seal ring 20 received thereover. A further reduced diameter or lower portion 22 extends downwardly from the portion 18 and has at least one, and preferably a plurality, of torque transmitting surfaces which may take the form of axially extending recesses or grooves 24 formed therein in circumferentially spaced arrangement.

Figure 6:
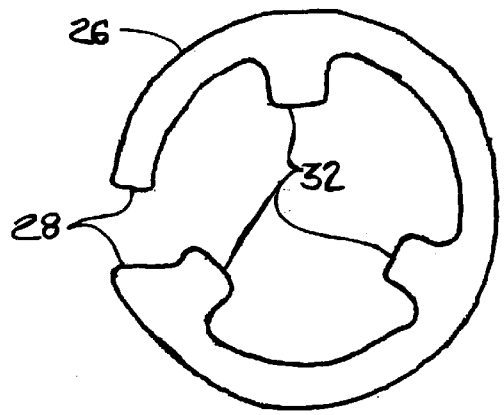

Referring to FIGS. 1, 2 and 6, a locking ring 26 preferably formed of spring material preferably has a radial slit 28 formed therethrough rendering the ring discontinuous with one edge thereof inclined to the plane of the ring form an axial lead portion denoted by reference numeral 30. However, it will be understood that alternatively a continuous spiral ring could also be employed, if desired. The inner periphery of the ring 26 has at least one, and preferably a plurality, of torque transmitting surfaces corresponding to those on the valve and which may take the form of radially inwardly extending tabs or lugs 32 formed thereon, which lugs are each engaged in one of the grooves 24 upon assembly of the ring over the reduced diameter portion 22 of the valve as shown in FIG. 1.

Figure 5:
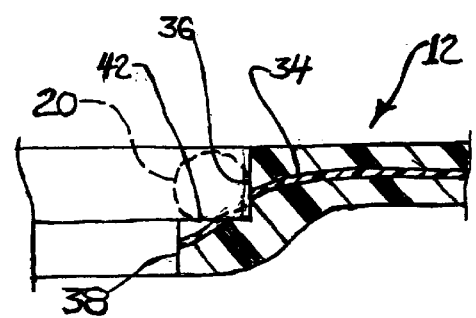
FIG. 5 is an enlarged view of a portion of the tank wall in the region of the access opening; and, FIG. 6 is a plan view of the blocking ring.

Referring to FIGS. 2 and 5, a portion of the wall of the tank 12 is shown with a vapor barrier layer 34 is shown broken by formation of an annular groove 36 in the outer surface of the tank wall, in the manner of a counterbore, about a smaller diameter access bore 38 formed through the wall of the tank. In the presently preferred practice the counterbore or annular groove is formed preferably by machining to provide dimensionally accurate surfaces for installation and sealing of the valve. In the presently preferred practice of the invention bore 38 and annular groove 36 are formed in the top wall of the tank; however, it will be understood they may be formed in any convenient area of the tank wall appropriate for proper function of the vent valve.

Referring to FIG. 5, a radially extending slit 40 which is inclined to the axis of the opening, is formed in the shoulder 42; and, the width of the slit is sufficiently greater than the thickness of the locking ring 26 to permit ease of passage therethrough.

Figure 3:
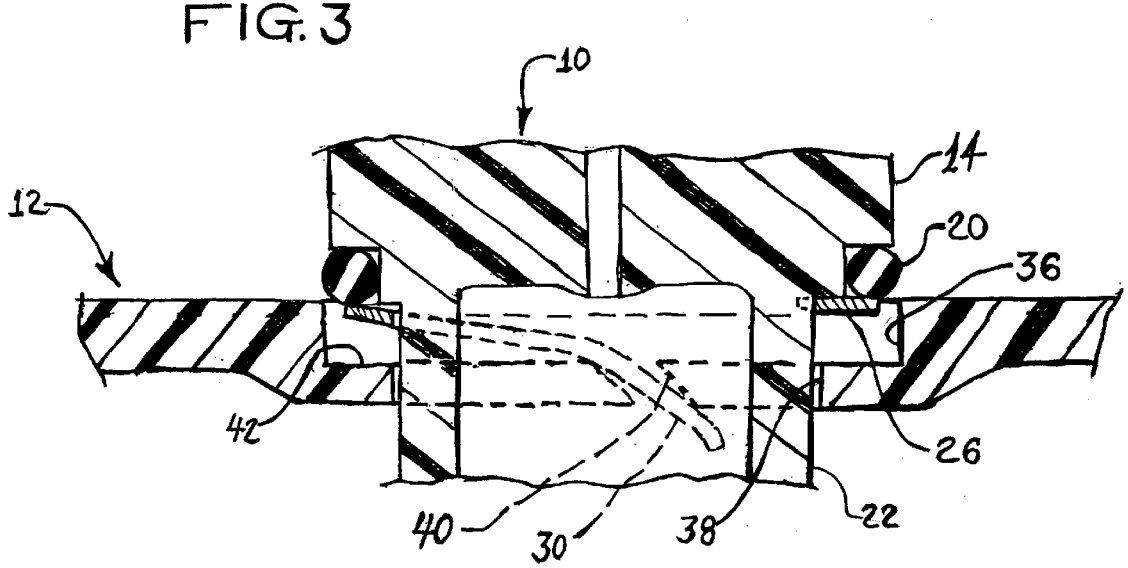
FIG. 3 is a cross-section of a portion of the valve and tank wall showing the valve partially inserted into the access opening.

Referring to FIG. 3, the subassembly 10 is shown partially installed with the reduced diameter 22 of the valve inserted through the access opening 38 and with the axial lead 30 of the locking ring 26 entered into the slit 40 by an initial rotation of the subassembly 10. It will be understood that the recesses or grooves 24 are of sufficient axial length on the reduced diameter 22 of the valve body to enable the necessary axial movement of the lugs 32 engaged therein without disengagement of the lugs 32 from the grooves 24.

Figure 4:
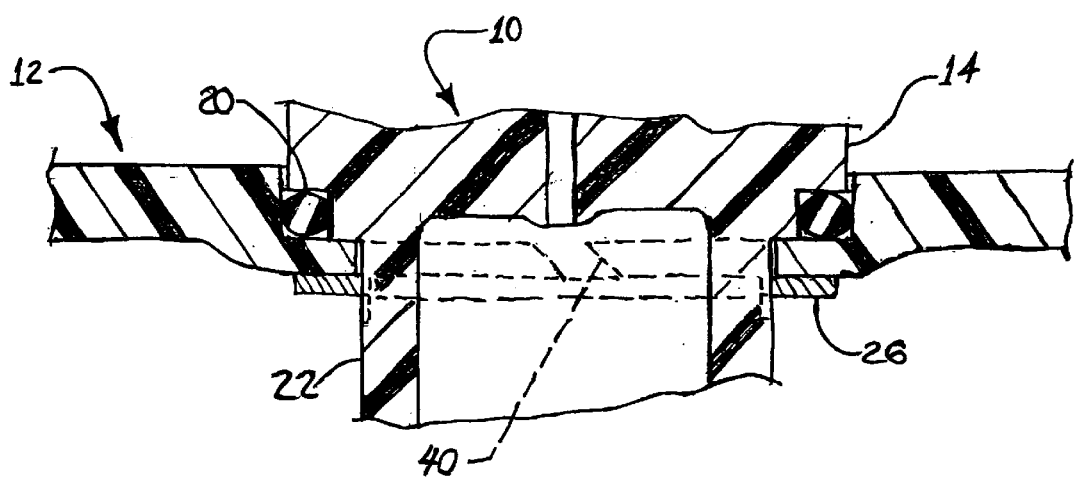
FIG. 4 is a view similar to FIG. 3 showing the valve subassembly in the fully installed position.

Referring to FIG. 4, the valve is shown completely installed wherein the subassembly 10 has been rotated further from the position of FIG. 3 sufficiently to feed the locking ring 26 entirely through the slit 40 and to position the locking ring inside the tank and engaging the undersurface of the tank wall 12. In the installed position in FIG. 4, it will be seen that the annular sealing ring 20 engages the wall 36 of the access opening and the diameter 18 of the valve to seal therebetween.

Referring to FIG. 5, the annular seal 20 is shown in dashed outline as sealing against the diameter 36 of the access opening and the shoulder 42 and thus seals the edges of the vapor barrier layer 34 in the tank wall.

The present invention thus provides a vapor vent valve which may, if desired, have a seal ring and locking ring disposed therewith forming a subassembly to facilitate installation. Upon insertion of the lower portion of the valve into an access opening in a fuel tank, the valve is positively retained and sealed therein by rotation of the valve to feed the locking ring through a slit formed in the access open of the tank wall. Thereafter the locking ring engages the inner surface of the tank wall and the valve to retain the valve in the installed position. The valve of the present invention is thus capable of simple mechanical installation, locking and being sealed into a fuel tank access opening without the need for separate fasteners or tools.

Although the invention has hereinabove been described with respect to the illustrated embodiments, it will be understood that the invention is capable of modification and variation and is limited only by the following claims.

What is claimed is:

1. A method of mounting and sealing a vapor vent valve through an access opening in the top of a fuel tank comprising:
   (a) forming at least one recess in the periphery of a first portion of the valve for extending into said opening;
   (b) disposing an annular flexible sealing ring on the valve;
   (c) slidably disposing an annular spring on the valve and axially slidably engaging said at least one recess with certain portions of said spring and said engaging preventing relative rotation therebetween and permitting limited axial movement of the spring on the valve;
   (d) forming an annular shoulder in the access opening of the tank said forming including forming a slit in the shoulder; and, inserting said first portion of the valve in the access opening and engaging one end of said spring in said slit, and,
   (e) rotating the valve from the exterior of the tank and feeding said spring through said slit until the spring passes through said slit and is completely within the interior of the tank; and,
   (f) sealing said access opening with said sealing ring and retaining said valve in said access openings with said spring.

2. The method defined in claim 1, wherein said step of forming at least one recess includes forming a plurality of recesses in circumferentially spaced arrangement.

3. The method defined in claim 1, wherein said step of disposing an annular spring includes disposing a substantially flat discontinuous annular spring.

4. The method defined in claim 1, wherein said step of engaging said at least one recess includes forming a radially inwardly extending projection on said spring.

5. The method defined in claim 1, wherein said step of forming at least one recess includes forming a plurality of recesses in circumferentially spaced arrangement; and, said step of engaging includes forming a plurality of radially inwardly extending projections on said spring and engaging each of said recesses with one of said projections.

6. The method defined in claim 1, wherein the step of forming an annular shoulder includes removing material and exposing an annular region of a vapor impermeable layer of the tank; and, the step of sealing the access opening includes contacting said exposed region of said impermeable layer with said annular sealing ring.

7. The method defined in claim 6, wherein the step of removing material includes machining.

8. The method defined in claim 1, wherein said step of sealing includes disposing said flexible seal ring in the annular shoulder.

9. A low permeation cam locking mounting of a vapor vent valve through an access opening in the upper wall of plastic fuel tank compromising:
   (a) a vent valve body having an outlet for communicating fuel vapor therethrough externally of the tank including a float operated valving portion for insertion into said tank opening, said valve body having at least one recess formed on the exterior periphery thereof;
   (b) an annular spring member having first and second ends received on said valve body with radially inwardly extending portions of said spring axially slidably engaging said recess and preventing relative rotation of said spring with respect to said body, said recess permitting limited axial movement of said spring;
   (c) an annular flange formed in the periphery of the access opening with a slit formed in said flange;
   (d) an annular seal disposed about said body wherein upon insertion of said valve body in said access opening said annular seal effects a seal between said body and the periphery of said access opening, and upon rotation of said valve body therein, said first end of said spring engages said slit, and upon further rotation thereof said spring feeds through said slit and said second end is passed through said slit and said spring registers against the inside surface of said tank upper wall retaining said valve in said opening.

10. The mounting as defined in claim 9, wherein the edge of a vapor impervious barrier layer of material is exposed in the periphery of said access opening and is contacted by said annular seal.

11. The mounting as defined in claim 10, wherein said exposed edge of said impervious barrier layer is formed by removing material from said access opening.

12. The mounting as defined in claim 9, wherein said spring has a relatively thin flat annular configuration.

13. The mounting as defined in claim 9, wherein said annular seal is formed of elastomeric material.

14. The mounting as defined in claim 9, wherein said first end of said spring is formed obliquely.

* * * * *